United States Patent
Elabd

[11] Patent Number: 5,818,525
[45] Date of Patent: Oct. 6, 1998

[54] RGB IMAGE CORRECTION USING COMPRESSED FLAT ILLUMINATED FILES AND A SIMPLE ONE OR TWO POINT CORRECTION ALGORITHM

[75] Inventor: Hammam Elabd, Sunnyvale, Calif.

[73] Assignee: Loral Fairchild Corp., Syosset, N.Y.

[21] Appl. No.: 666,685

[22] Filed: Jun. 17, 1996

[51] Int. Cl.⁶ ...................................................... H04N 9/04
[52] U.S. Cl. ........................................... 348/268; 348/273
[58] Field of Search .............................. 348/70, 268, 269, 348/270, 271, 742, 743, 758, 761, 751, 766, 264, 265, 272, 273, 342; 349/1, 193; 382/167, 274; 358/518, 522, 523; 345/155, 153, 199; H04N 9/04

[56] References Cited

U.S. PATENT DOCUMENTS

| | | |
|---|---|---|
| 4,312,050 | 1/1982 | Lucas . |
| 4,527,189 | 7/1985 | Ooi et al. . |
| 4,535,417 | 8/1985 | Peacock . |
| 4,879,592 | 11/1989 | Erest ........................................ 348/267 |
| 4,887,121 | 12/1989 | Pritchard . |
| 4,942,458 | 7/1990 | Miyajima et al. . |
| 5,053,615 | 10/1991 | Patel . |
| 5,132,826 | 7/1992 | Johnson et al. ............................. 359/93 |
| 5,172,146 | 12/1992 | Wooldridge . |
| 5,185,666 | 2/1993 | Capitant et al. . |
| 5,216,493 | 6/1993 | DiBella et al. . |
| 5,309,239 | 5/1994 | Bouwhuis ................................. 348/265 |
| 5,347,320 | 9/1994 | Lim . |
| 5,418,380 | 5/1995 | Simon et al. . |
| 5,485,212 | 1/1996 | Frederick . |
| 5,497,435 | 3/1996 | Berger . |
| 5,581,301 | 12/1996 | Ninomiya ................................. 348/342 |

*Primary Examiner*—Andrew I. Faile
*Assistant Examiner*—Tuan V. Ho
*Attorney, Agent, or Firm*—Perman & Green, LLP

[57] ABSTRACT

A memory efficient system of storing color correction information for liquid crystal tuning filters when used with electronic imaging cameras to produce color images, which color correction information is stored with maximum possible gain to optimize accuracy preparatory to compression. The system bins the color correction image, for example, from a 4K×4K CCD sensor into a 500×500 or 1K×1K file, and then applies the JPEG and/or wavelet compression algorithm with a default configuration and/or a custom quantization table that emphasizes low frequency changes with more bits than high frequency changes with less bits. At the end of the compression, the compressed R, G, B files and an n-point correction executable algorithm are stored on floppy disk or CD ROM and are used to automatically take control of image enhancement when invoked by the photographer.

33 Claims, 9 Drawing Sheets

CODED IMAGE SENSOR THAT STORES R & B SAMPLES ON THE SENSOR UNDER OPAQUE REGIONS (▨) AND STORES G IN DETECTOR CAPACITANCE

FIG. 3

UNCODED CCD SENSOR FOR 3 SHOT OPERATION

FIG. 4 CALIBRATION FIELDS WITH CODED R, G, B SENSOR

FIG. 10(e) RED IMAGE CORRECTED

| 1000 | | | | | | |
| | 1222 | | | 1111 | | |
| | | | 900 | | | |

FIG. 10(d) DARK FIELD CORRECTED IMAGE $= V_i - V_d$

| 1000 | | | 900 | | 1700 | |
| | 1100 | 900 | 2000 | 1000 | 800 | 2000 |
| | 1200 | 1000 | | 1200 | | |

FIG. 10(c) RED CORRECTION FLAT FIELD $R_i =$

| 1000 | | | 1000 | | | |
| | 900 | | | 900 | | |
| | 0 | 0 | | | | |

FIG. 11

RGB IMAGE CORRECTION USING COMPRESSED FLAT ILLUMINATED FILES AND A SIMPLE ONE OR TWO POINT CORRECTION ALGORITHM

BACKGROUND OF THE INVENTION

Field of the Invention

The present invention relates to electronic color imaging and more particularly to a memory efficient method and means for storing color or infrared correction information for liquid crystal filters that are used with electronic color imaging CCD or CMOS cameras.

Prior Art

Typically in the electronic imaging art a 4K×4K CCD image sensor may be operated behind a liquid crystal tuned (controlled) filter (LCTF), to sense an image in red, green, and blue colors and thus produce color images. In such instances, it is not uncommon for the liquid crystal tuned filter to cause some color non-uniformities across the resulting image field of view. For example, when the CCD imaging array is subjected to flat field white illumination, the resulting image usually contains an imbalance in the red, green, and blue colors across its field of view. This liquid crystal filter color distortion appears superimposed on other offset and multiplicative noise from the CCD, optics, and camera with either a coded or uncoded image sensor.

Problem to be Solved:

It is accordingly a problem to eliminate the color non-uniformities that occur across the image field of view that are produced when using an electronic color image sensor, e.g., a CCD sensor, in combination with a liquid crystal tuned filter for snap-shot, slow framing, or video rate applications.

Objects:

It is therefore an object of the present invention to provide a method and means for controlling color non-uniformities in color images produced by CCD image sensors, particularly uncoded as well as coded sensors, due to use with liquid crystal tuned filters.

It is also an object of the invention to provide a memory efficient method and means for storing color correction information for liquid crystal tuned filters that are used with electronic color imaging cameras.

It is a further object of the present invention to make it possible for a camera operator to invoke the stored color correction information to automatically take control of image enhancement when using a CCD image sensor in combination with a liquid crystal tuned filter.

SUMMARY OF THE INVENTION

The present invention involves a system including a memory efficient method and means of storing color correction information for liquid crystal tuning filters when used with color electronic imaging cameras. The stored correction information may be used in minimizing color imbalance or distortion in an image produced by a camera, which distortion is due to color non-uniformities, caused by the filters, across the image field of view. The actual correction may be done by software or high speed digital signal processing in the case of video or framing cameras. For example, when utilizing a 4K×4K CCD image sensor, the sensor used to capture the RGB non-uniformities is binned internally and corrected for its own non-uniformities and blemishes to decouple the CCD non-uniformities from filter color non-uniformities. The color correction image from the 4K×4K array is also binned externally to a 500×500 or 1K×1K file, and may be compressed by applying the JPEG and/or wavelet compression algorithm with either a default configuration or a custom quantization table that emphasizes low frequency changes with more bits than are used for high frequency changes. At the completion of compression, the compressed R, G, B files and a one or two or more point correction executable algorithm are stored, e.g., on a floppy disk or CD ROM, so that the stored files can be automatically decompressed and executed to take control of image enhancement when invoked by the camera operator or photographer during subsequent use.

BRIEF DESCRIPTION OF THE DRAWINGS

FIGS. 10 (a) to 10 (d) illustrate the operation of a 2-point correction algorithm as applied to the red (R) image portion of a coded sensor image produced through an LCTF filter, using 2×2 resolution.

DETAILED DESCRIPTION OF THE PREFERRED EMBODIMENTS

The present invention is embodied in a system including an improved method and means for enhancing electronic color images that are produced by electronic image sensors, such as CCD sensors, in combination with liquid crystal tuned filters (LCTF). The system efficiently stores color correction information for use in minimizing color imbalance or distortion in the subsequently produced electronic images that is due to filter-caused color non-uniformities across the image field of view. Such color imbalance may be corrected for both sequential three-shot color cameras and snap-shot color cameras using software and hardware in accordance with the invention.

Figure 1:
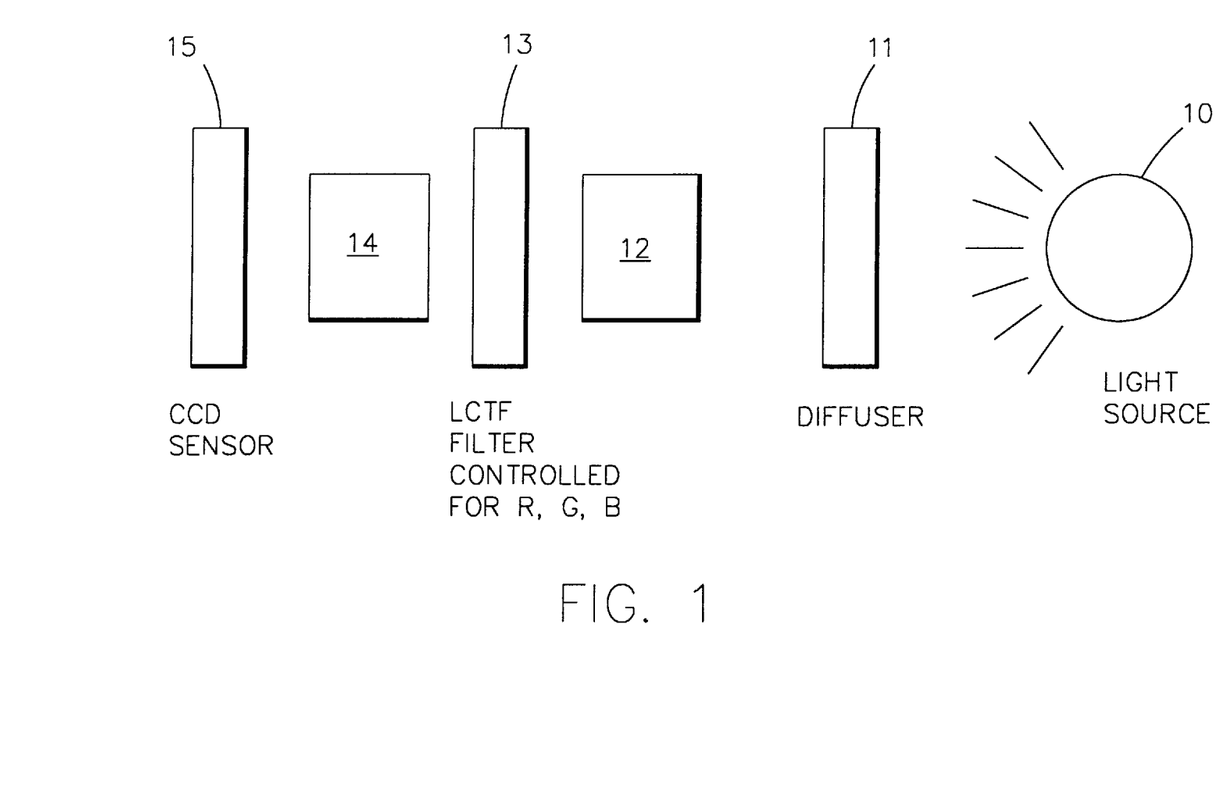
FIG. 1 is a system for illustrating the manner in which a color image is sensed in accordance with the present invention.
Figure 2:
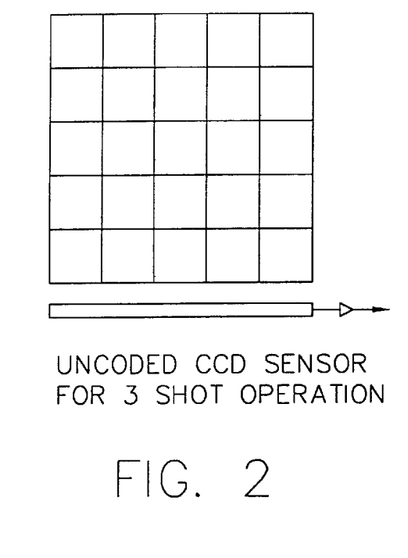
FIG. 2 illustrates one form of CCD sensor that may be used in the system of FIG. 1, involving a three-shot CCD color camera with a regular uncoded CCD sensor for three-shot operation.
Figure 3:
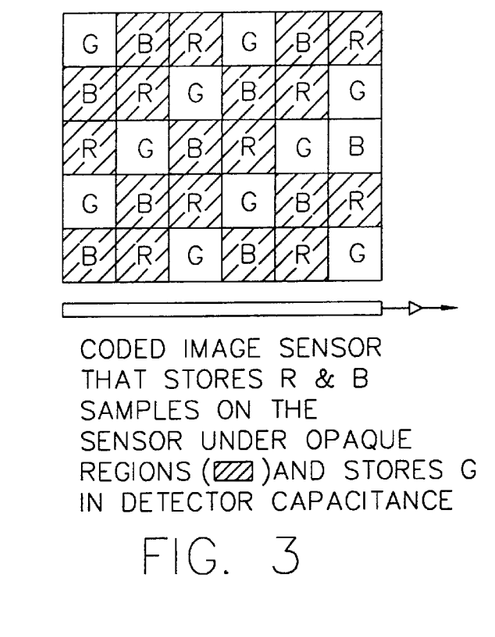
FIG. 3 illustrates another form of CCD sensor that may be used in the system of FIG. 1, involving a single-shot coded image sensor that stores R, G, and B samples on the same sensor surface under opaque memory areas.
Figure 4:
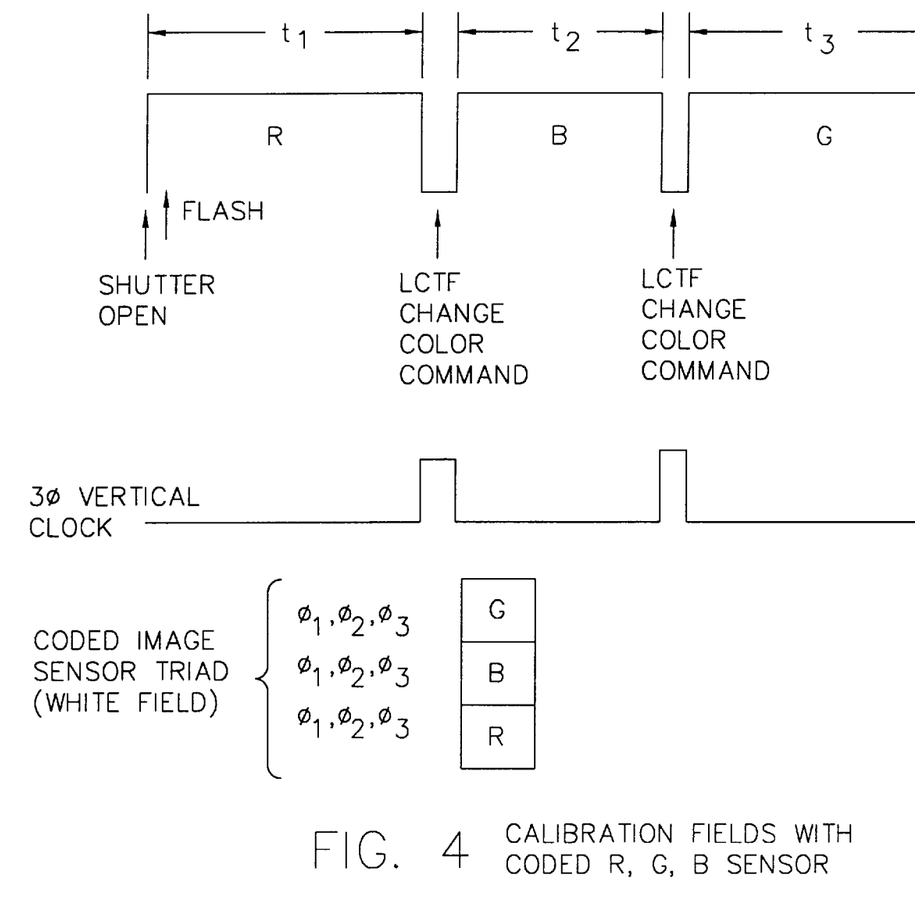
FIG. 4 is a diagram illustrating the clock signals and timing for storing calibration files with the coded sensor shown in FIG. 3.

More specifically, a basic set up or system for illustrating the manner in which a color image is sensed is shown in FIG. 1 wherein light from a light source 10 passes through a flat field diffuser 11 and is directed by suitable optics 12, e.g., a spherical illuminator, to uniformly illuminate an LCTF filter 13, controlled for R, G, and B image passage. The colored light fields or frames from the filter 13 are directed by further suitable optics 14 to be sensed by an electronic image sensor 15. The selection and positioning of the optics may be varied to suit a particular application, and the sensor 15 may be embodied, for example, in a three-shot CCD color camera as a regular uncoded CCD sensor 15' for three-shot operation as shown in FIG. 2, or a single-shot coded image sensor 15" that stores R, G, and B samples on the same sensor surface 16 under opaque memory areas 16' as shown in FIG. 3. Accordingly, the flat field RGB files are collected with the filter 13 in the R, G, and B states in either separate three-shot image files in a three-shot CCD imager, from which separate R, G, and B frames are readout, or on the same surface in a single-shot coded image sensor. In the latter instance, two out of each triad of pixels is covered to store R, G, and B subframes during flat field calibration and the subframes are then interpolated to the complete R, G, and B frames for correction purposes. Specifically, the image charge for each color is developed through a clear aperture sensor site and the first two charge packets are successively transferred to two opaque memory sites so as to store the R, G, and B information separately. A diagram illustrating the clock signals and timing for storing the calibration files on the coded sensor 15" in this manner is shown in FIG. 4. The calibration fields for color correction are the three separate R, G, and B subfields (frames) developed by the coded sensor 15" when it images a flat field while being clocked using three-phase clocks ($\phi_1$, $\phi_2$, $\phi_3$) that are synchronized with the LCTF color filter switching signals.

Thus, individual dark (shutter closed) and light flat fields are captured through the LCTF filter, and the non-uniformity components are amplified across the intensity scale preparatory to being stored. Preferably, the fields are stored in compressed form.

Figure 5:
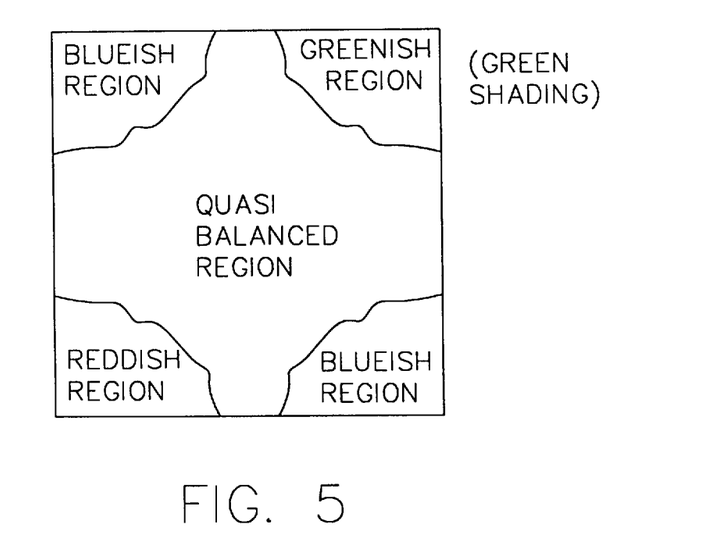
FIG. 5 is an exemplary illustration of color distortion (flat files) as seen on a display.
Figure 6:
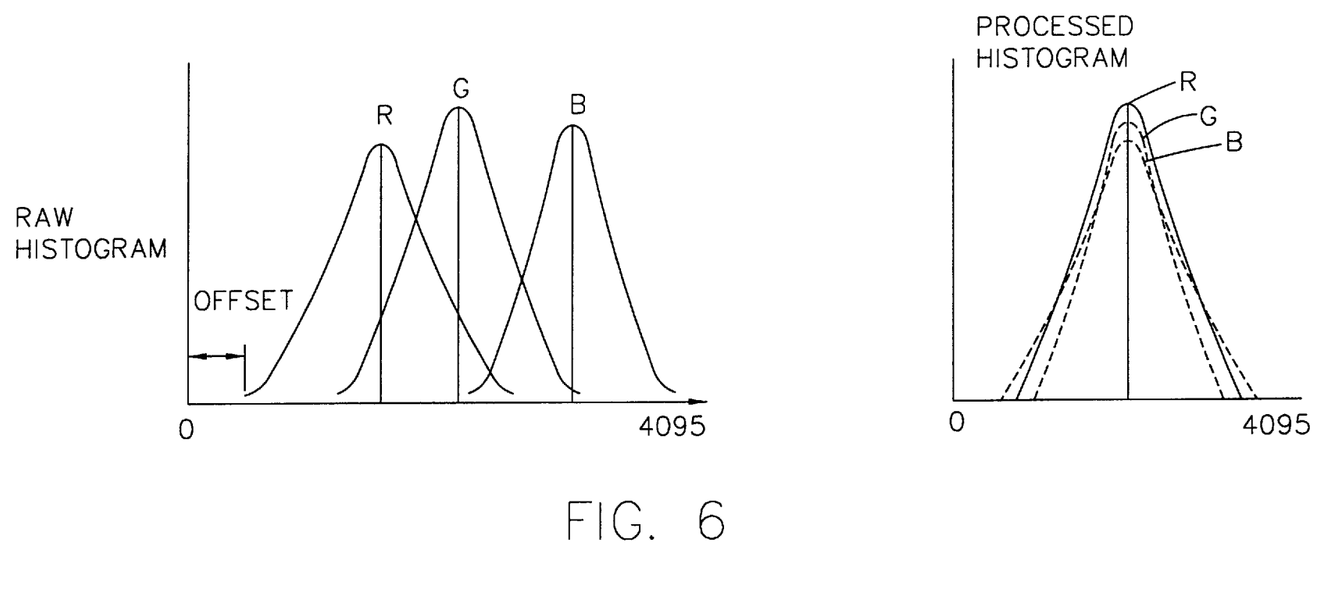
FIG. 6 shows a color correction flat (white) file composed of RGB flat files including histograms for flat field RGB files used in correction, before and after processing.

FIG. 5 is an exemplary illustration of color distortion (flat files) as seen on a display. The offset is subtracted, but recorded, and the RGB fields are balanced before compression for generating the maximum precision correction files. Also, 32-bit to 40-bit (wide word) floating point arithmetic can be used for calculations to avoid residual non-uniformity and enhance correction accuracy. The offset is shown in FIG. 6 which illustrates, on the left, a color correction flat (white) file composed of raw histograms for flat field RGB files used in correction, before processing, and on the right, a processed histogram in the form after processing. Any offset component subtracted from RGB histograms is recorded for later use during image correction of the snap-shot or three-shot color image. The stored offset numbers are used in restoring filter transmission data to optimize color crosstalk correction of the coded image sensor required as a result of light leakage under the light shielded areas of the coded sensor's FPA. The offset may correspond to CCD dark current or filter transmission.

The amplified red (R), green (G), and blue (B) image files are then preferably compressed using the JPEG and/or wavelet compression algorithm. The quantization tables of the JPEG algorithm are edited to emphasize low frequency variation by using more bits than for the high frequency changes. All high frequency terms are sampled with fewer bits. Compression ratios of x30 to x300 are possible on each of the R, G, and B image information files while maintaining the most significant color distortion details needed to perform flat field correction of the image.

Figure 7:
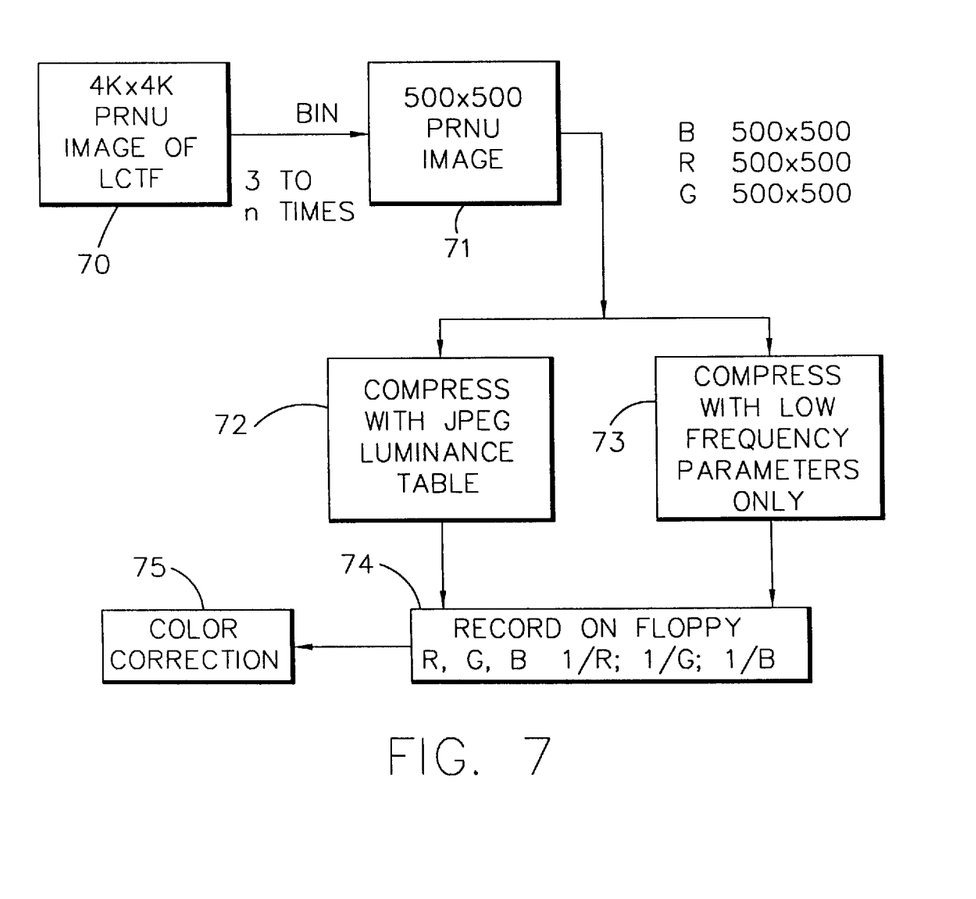
FIG. 7 is a flow chart illustrating a representative set, of steps involved in carrying out the present invention.

The CCD sensor used to capture the RGB non-uniformities is binned and corrected for its own non-uniformities to decouple the CCD non-uniformities from filter color non-uniformities. For instance, as shown in FIG. 7, in the first step of an exemplary procedure, an n×n, e.g., 4K×4K, photo response non-uniformity (PRNU) image array 70 is produced by the LCTF, and in the second step, the array is binned internally to CCD and externally to m×m, where m<n, e.g., m=500×500 or 1000×1000 elements 71, either on-chip or off-chip. Binning reduces chip non-uniformities and blemishes. The calibration frames can be collected by the same CCD chip or a different chip. In all cases, blemished pixels are corrected or substituted for by neighboring pixels.

In the third step, the external binned image is then compressed, e.g., with the default JPEG compression algorithm 72, using a JPEG luminance quantization table if high quality correction is desired. The resulting compressed file has a size 1/30 to 1/300 times that of the uncompressed RGB (flat field) file. The quantization table suggested for the JPEG algorithm, which is based on psychovisual thresholding and derived empirically using luminance and 2:1 horizontal subsampling, is in the form of TABLE 1 below. The user may edit the quantization table or JPEG compression quality factor to improve correction accuracy and reduce residual color shading or blocking artifacts.

TABLE 1 provides the "high quality" correction compression produced by the JPEG algorithm (72) as shown in the system in FIG. 7. TABLE 2, following TABLE 1 below, additionally or alternatively, provides the low-frequency "low quality" correction compression path (73) of the system using compression with low frequency parameters only.

TABLE 1

Default JPEG Q(u,v) Quantization Table for Luminance Components "CRT Observer"

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

TABLE 2

R, G, B Chrominance/Monochrome 3x Color Files LCTF Color Filter Non-Uniformities Quantization Table
RECOMMENDED

| 16  | 11  | 10  | 99  | 120 | 120 | 120 | 120 |
|-----|-----|-----|-----|-----|-----|-----|-----|
| 12  | 12  | 14  | 99  | 120 | 120 | 120 | 120 |
| 14  | 13  | 99  | 99  | 120 | 120 | 120 | 120 |
| 99  | 99  | 99  | 120 | 120 | 120 | 120 | 120 |
| 120 | 120 | 120 | 120 | 120 | 120 | 120 | 120 |
| 120 | 120 | 120 | 120 | 120 | 120 | 120 | 120 |
| 120 | 120 | 120 | 120 | 120 | 120 | 120 | 120 |
| 120 | 120 | 120 | 120 | 120 | 120 | 120 | 120 |

The resulting compressed correction files (from 72 and/or 73) may be stored, in the next step, e.g, on a floppy disk 74, in inverted or direct mode, along with an executable algorithm to be subsequently used for color correction 75. The floppy disk 74 may contain the flat field RGB correction files obtained using several lenses, e.g., 80 mm, 200 mm, etc., to correct for illumination non-uniformity produced by each lens surface and chromatic aberration produced by different lens systems. Also, several flat fields (of n-points, e.g., 2 or 3 or 4 points) of the LCTF calibration may be stored at different intensities to correct for any non-linearity in the LCTF transmission per color channel.

The compressed R, G, B files are either expanded back to 4K×4K resolution or supplied in 500×500 resolution with the executable algorithm to repeat some corrections parameters on each four columns and four rows. The use of 500×500 binning avoids the need for editing the JPEG source code to the 4K×4K level.

The information used in image correction involves:

| | | |
|---|---|---|
| $v_1$ Real Image File | 4K × 4K, 12 bit | Captured by photographer |
| $v_d$ Dark Field Image File | 4K × 4K, 12 bit | Captured by photographer |
| R Color R file | 500 × 500, 8/12 bit* | Sent on floppy |
| B Color B file | 500 × 500, 8/12 bit* | Sent on floppy |
| G Color G file | 500 × 500, 8/12 bit* | Sent on floppy |

*= filter characteristics compressed by different quantization table accuracy $$y_{corrected\ image} = (v_{iR} - v_d)\ 1/R\ g_1 + \\ (v_{iG} - v_d)\ 1/G\ g_2 + \\ (v_{iB} - v_d)\ 1/B\ g_3$$

where $g_1$, $g_2$, and $g_3$ are gain or scaling factors for individual colors to balance the image.

The 1/R, 1/G, and 1/B represent a look up table (LUT) or inverse (division or multiply by quotient) operation, such as typically done on an IR-imaging FPA for uniformity correction, and is repeated for the 4K×4K array in the appropriate steps determined by the binary procedure.

Figure 8:
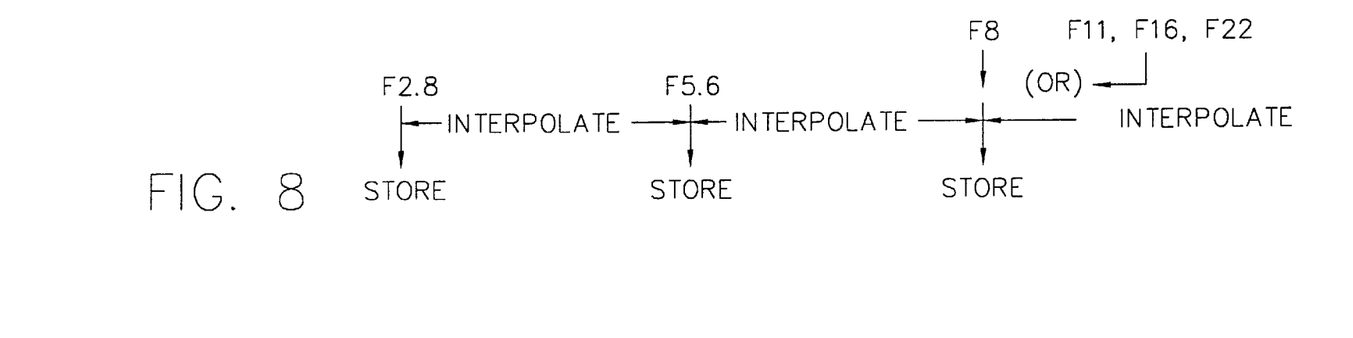
FIG. 8 is an illustration of the selection of an interpolated F/# value in response to color correction information stored in accordance with the invention.

The technique described separates the CCD effects from the LCTF color effects. The same 1/R, 1/B, 1/G tables are stored for 3 or 4 different F/# on the lens, as the floppy disk size may make it hard to store each F/# color correction matrix. These tables have been found to be enough to correct the image under all F/# or exposure conditions. With an 80 mm F1 lens, the three F/# correction files that represent the filter non-uniformities are the RGB JPG files for F 2.8, F 5.6, and F 8 or F 11. The last file is good all the way to the F 22 setting. The camera operator or photographer will be prompted to enter the F/# used in building the image and the executable algorithm will interpolate the pixel correction values 1/R, 1/G, 1/B between the two nearest stored F/# settings, as illustrated in FIG. 8. The executable algorithm may alternatively use the file with the nearest F/# as will be seen from TABLE 3. The R, G, B or 1/R, 1/G, 1/B values are expanded from storage before interpolation using the JPEG and/or wavelet decompression algorithm.

TABLE 3

80 mm photographic lens correction files*

| F/# used in photography | | Correction file used |
|---|---|---|
| F 2.8 | (0, 1/2) | F 2.8 |
| F 4 | (0, 1/2) | F 5.6 or interpolate |
| F 5.6 | (0, 1/2) | F 5.6 |
| F 8 | (0, 1/2) | F 8   or F 11 |
| F 11 | (0, 1/2) | F 8   { or F 11, or |
| F 16 | (0, 1/2) | F 8   { interpolate |
| F 22 | (0, 1/2) | F 8   { to F 22 |

*Interpolate at the half F/stop settings.

Figure 9:
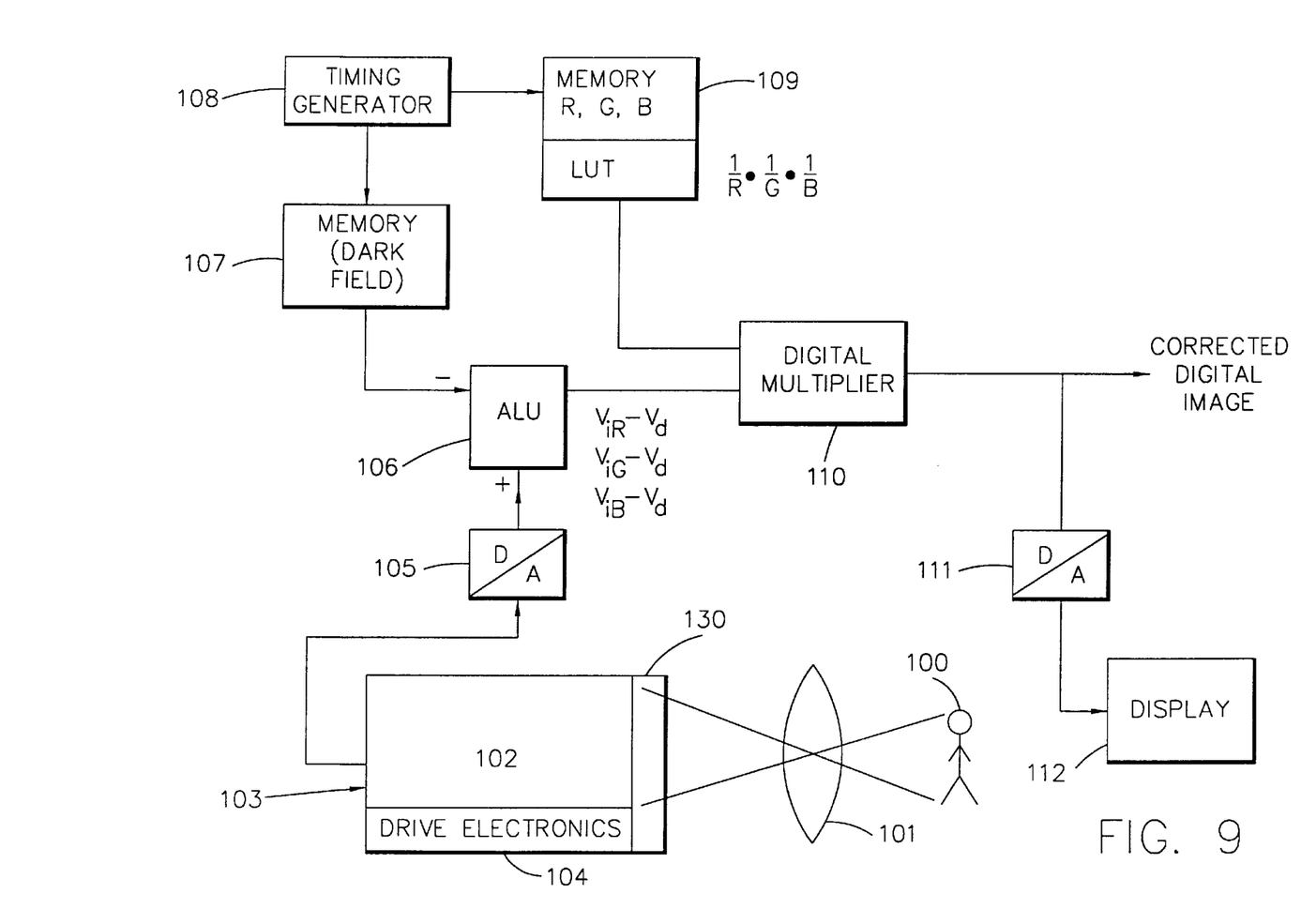
FIG. 9 is a schematic diagram illustrating a hardware implementation of a snap-shot camera or video camera containing the LCTF filter correction feature.
Figure 10A:
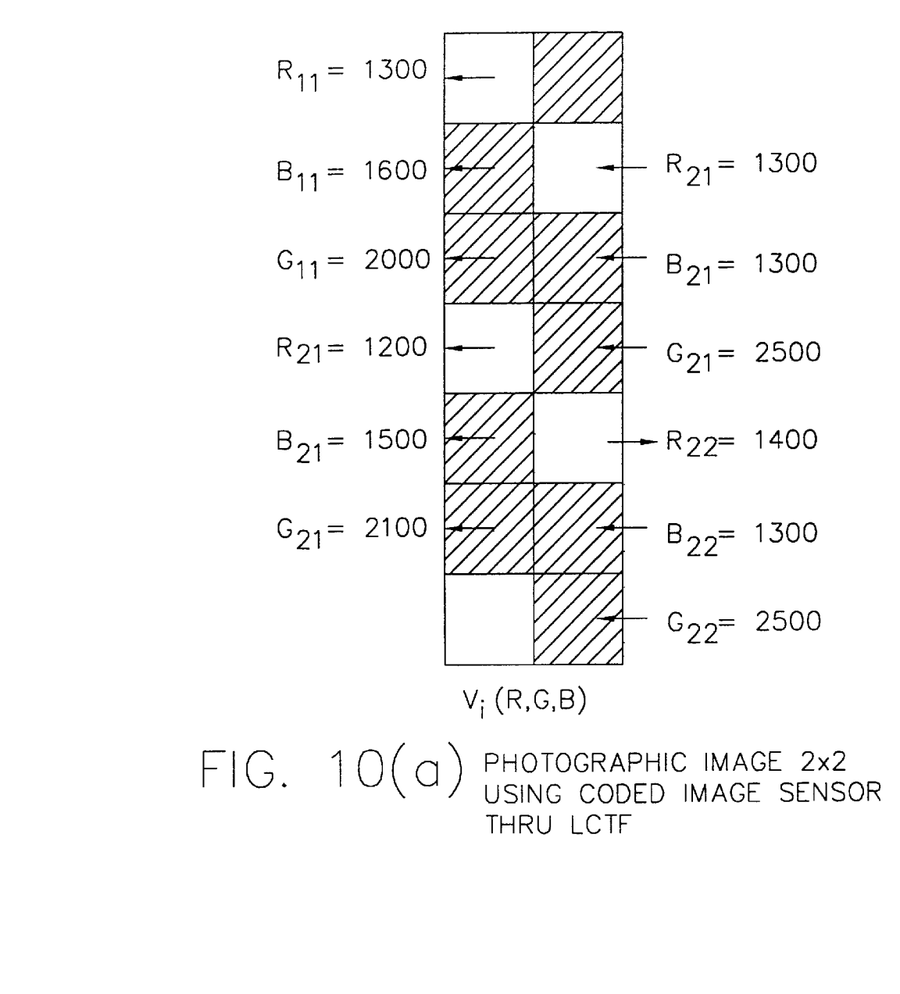
Figure 10B:
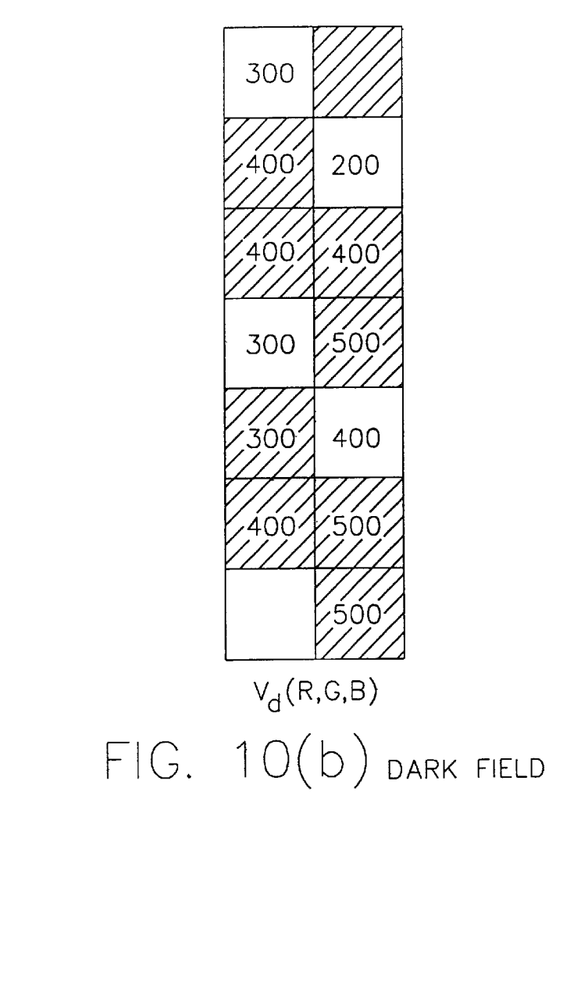
Figure 10C:
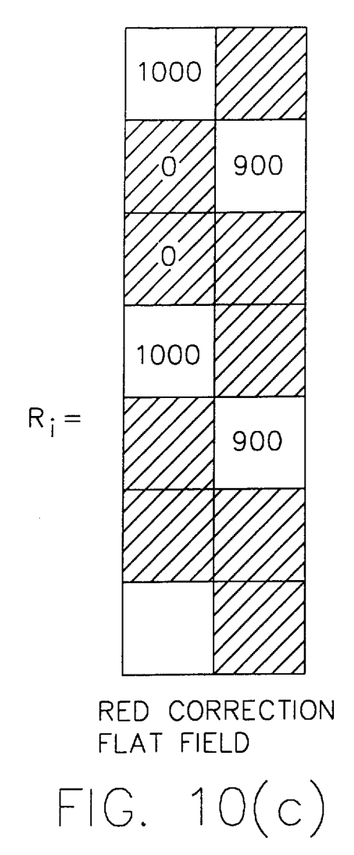
Figure 10D:
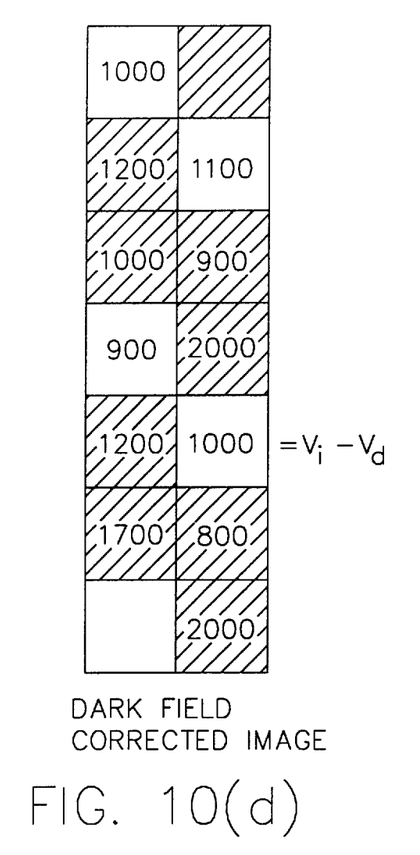
Figure 10E:
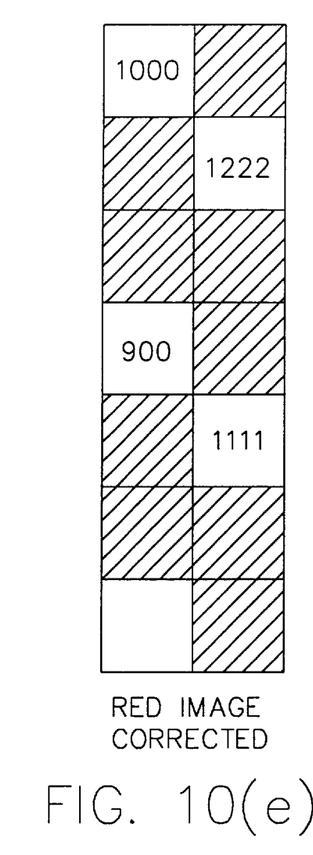

Thus, flat field correction files of sampled F/#s and sampled lenses with different focal lengths may be stored on a floppy diskette for later use in image correction and enhancement when an image, created with these components, is to be displayed. Either compressed composite color files or separate color files may be stored in direct (R,G,B+offset) or inverted (1/R, 1/G, 1/B) form. For the case of slow framing or video cameras used with LCTF filters, this color correction information is kept in solid state memory for rapid real time correction of image data using subtraction in an arithmetic logic unit (ALU) and solid state multiplier. A system for implementing these functions and incorporating suitable hardware for these purposes is shown in FIG. 9 which illustrates a hardware implementation of a snap-shot camera or video camera containing the LCTF filter correction. As seen in FIG. 9, a subject 100 is imaged through suitable optics 101 and an LCTF filter 130 onto the sensor surface 102 of a camera 103 having appropriate drive electronics 104. The analog video output of the camera 103 is fed through an analog-to-digital (A/D) converter 105 to one input of an arithmetic logic unit (ALU) 106. The other input of the ALU 106 receives dark field signals from an average dark field image file memory 107 under the control of a timing generator 108. Timing generator 108 also controls a color correction memory and look-up-table (LUT) component 109 with a correction executable algorithm that outputs stored RGB color correction information signals to a digital multiplier 110. The digital multiplier 110, along with the color correction signals, receives signals from the ALU 106 for the three color images sensed by the sensor 102, which signals have been dark field corrected ($v_{iR}-v_d$, $v_{iG}-v_d$, $v_{iB}-v_d$) but not color corrected. The output of the digital multiplier 110 is in turn a dark field and color corrected digital image of the R, G, and B frames, that is then converted by a digital-to-analog (D/A) converter 111 for presentation on a suitable analog display 112, or a printer or other output device.

An illustration of the operation of a 2-point correction algorithm on a coded sensor image produced through an LCTF filter and using 2×2 resolution is shown in FIGS. 10 (a) to 10 (d). To begin with, FIG. 10 (a) shows a portion of an exemplary captured real (RGB) image, with the $v_i$ counts in ADU units, i.e., analog-to-digital converter units, and FIG. 10 (b) shows the related dark field image with the $v_d$ counts also in ADU units. FIG. 10 (d) shows the dark field corrected image, i.e., $v_i-v_d$. FIGS. 10 (c) to 10 (e) illustrate red (R) image correction, which is applied similarly to blue (B) and green (G) images for complete RGB image correction. FIG. 10 (c) shows the red ($R_i$) correction flat field that is compared with the dark field corrected image of FIG. 10 (d) to produce the corrected red image of FIG. 10 (e) corrected by the red flat field.

Figure 11:
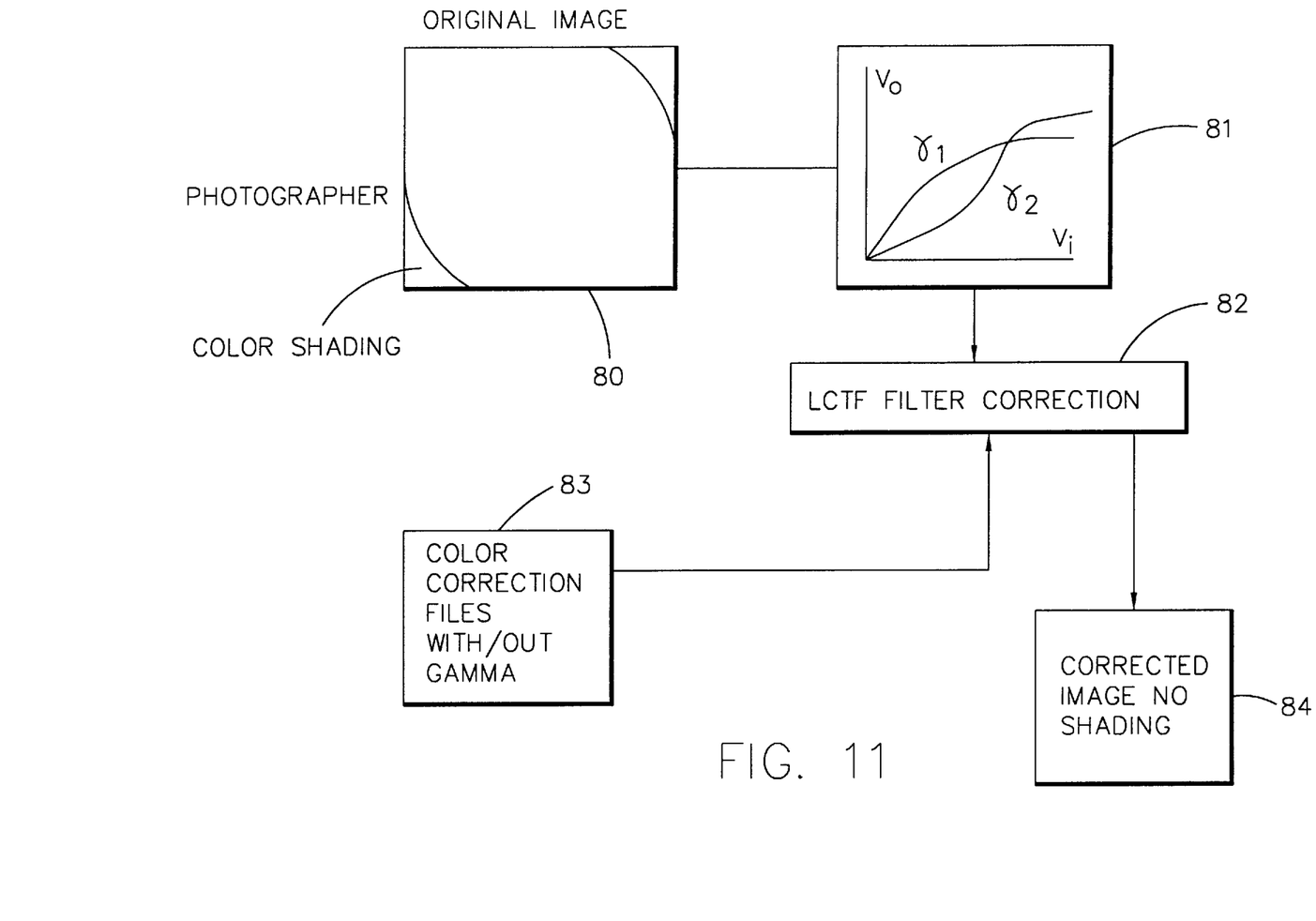
FIG. 11 illustrates a system for applying a strong gamma (non-linear) transform or projection to the image data for an image containing color shading before or after color correction files are used to correct the image.

Additionally, as shown in FIG. 11, strong gamma (nonlinear) transform or projection of image data may be applied to the image produced by the photographer or user before or after the color correction files are used to correct the image. The purpose of the strong gamma (γ) correction is to avoid the need to apply large gains to the image information to see the color details of the image. The high gain may cause residual errors (non-uniformities of the shading) in the color correction scheme to appear on the image. More particularly, it will be seen from FIG. 11 that the sensed image 80 produced by the photographer and containing color shading is electronically input to a gamma control and color processing device 81, the output of which is provided to a component 82 for calculating the LCTF filter correction equations. Component 82 also receives color correction information from the color correction file storage device 83 and applies it before or after the gamma correction information, to produce a corrected image 84 with no shading. If color correction files are applied after gamma correction, then they can be treated by the same or similar γ transform.

It will therefore be seen that a memory efficient system for storing color correction information for liquid crystal tuning filters, when used with color electronic imaging cameras, has been described wherein the stored correction information is available to minimize color imbalance or distortion in an image produced by a camera, which distortion is due to color non-uniformities, caused by the filters, across the image field of view. The actual correction may be done by software or high speed digital signal processing in the case of video or framing cameras. The sensor used to capture the RGB non-uniformities is binned internally and corrected for its own non-uniformities to decouple the CCD non-uniformities from filter color non-uniformities, and the color correction image is binned externally to a smaller file which may then have the JPEG and/or wavelet compression algorithm applied with either a default configuration or a custom quantization table that emphasizes low frequency changes with more bits than are used for high frequency changes. At the completion of compression, the compressed R, G, B files and a one or more point correction executable algorithm are stored, e.g., on a floppy disk or CD ROM, and are automatically decompressed and take control of image enhancement when invoked by the camera operator or photographer during subsequent use.

What is claimed is:

1. Apparatus for enhancing color images produced by electronic imaging cameras when used with liquid crystal tuning filters, comprising:

means, having a sensing matrix of n×n, for sensing a color image produced by an LCTF filter and storing the sensed n×n signals representative of said color image;

means for binning the stored n×n signals into a binned file;

means for storing said binned file with a correction executable algorithm; and means for invoking said stored binned file and said correction executable algorithm to automatically take control of image enhancement when a color image is being reproduced, to enhance said color image.

2. A system as in claim 1 further comprising:

means for compressing said binned file before being stored by said storing means and for allocating more bits to low frequency changes than high frequency changes.

3. A system as in claim 2 wherein said compressing means comprises means for performing a JPEG compression using a default luminance quantization table.

4. A system as in claim 2 wherein said compressing means comprises means for performing a JPEG compression using a custom quantization table.

5. A system as in claim 2 wherein said compressing means comprises means for applying a wavelet compression algorithm.

6. A system as in claim 2 wherein said invoking means comprises means for decompressing said stored compressed file and executing said correction executable algorithm.

7. A system as in claim 2 wherein said means for storing said binned file with a correction executable algorithm comprises means for storing a color correction white flat file composed of raw histograms for flat field RGB files used in correction, and further comprising:

means, operable before said means for compressing, for subtracting and storing the offset for use during image enhancement when a color image is being reproduced.

8. A system as in claim 1 wherein said means for binning the stored n×n signals comprises means for binning said n×n signals into an m×m file, where n>m, and further comprising:

means for compressing said m×m file and allocating more bits to low frequency changes than high frequency changes.

9. A system as in claim 8 wherein n=4K and m=one of 500 and 1K.

10. A system as in claim 1 wherein said sensing means comprises means for performing gamma correction on the color image being enhanced.

11. A system as in claim 1 wherein said sensing means comprises means for producing real image file data $\Gamma_{iR}$, $\Gamma_{iG}$, $\Gamma_{iB}$, and dark field image file data $\Gamma_d$, and said stored binned file comprises R, G, and B file data, and further comprising means for reproducing enhanced color images comprising means for executing:

$$y_{corrected\ image} = (v_{iR} - v_d)\ 1/R\ g_1 + (v_{iG} - v_d)\ 1/G\ g_2 + (v_{iB} - v_d)\ 1/B\ g_3$$

where $g_1$, $g_2$, and $g_3$ are gain or scaling factors for the individual colors to balance the image.

12. A system as in claim 1 further comprising:

means for separately binning said sensed n×n signals representative of said color image; and means for correcting for image non-uniformities due to said sensing means to decouple said non-uniformities from non-uniformities due to said liquid crystal tuning filter.

13. A system as in claim 1 wherein said sensing means comprises one of a snap-shot sensor, a video coded sensor, and a video uncoded sensor.

14. A system as in claim 1 wherein said sensing means comprises a coded sensor having clear aperture sensor sites, each with at least one opaque memory site coupled thereto for storing a color image frame charge packet transferred from said coupled clear aperture sensor site.

15. A system as in claim 1 wherein said sensing means comprises a coded sensor and further comprising means for executing said executable correction algorithm to produce coded image enhancement with 2×2 resolution.

16. A memory efficient method for storing color correction information for liquid crystal tuning filters when used with electronic imaging cameras to produce color images, comprising the steps of:

producing a color image using an imaging camera with a sensing matrix of n×n and an LCTF filter, and storing the n×n signals representative of said color image;

binning the stored n×n signals into an m×m file, where m<n; and storing said binned file with a correction executable algorithm making it available to automatically take control of image enhancement when invoked.

17. The method of claim 16 further comprising the step of:

compressing said binned file before said storing step and allocating more bits to low frequency changes than high frequency changes.

18. The method of claim 17 wherein said compressing step comprises performing a JPEG compression using a default configuration table.

19. The method of claim 17 wherein said compressing step comprises performing a JPEG compression using a custom quantization table.

20. The method of claim 17 wherein said compressing step comprises applying a wavelet compression algorithm.

21. The method of claim 17 wherein the step of storing said binned file with a correction executable algorithm comprises storing a color correction white flat file composed of raw histograms for flat field RGB files used in correction, and further comprising the step of subtracting and storing the offset, before the compressing step, for use during image enhancement when a color image is being reproduced.

22. The method of claim 21 wherein floating point wide word is used for the calculations in said step of subtracting and storing the offset.

23. The method of claim 16 further comprising the step of:
compressing said m×m file and allocating more bits to low frequency changes than high frequency changes.

24. The method of claim 16 wherein the step of producing a color image comprises producing real image file data $v_{iR}$, $v_{iG}$, $v_{iB}$, and dark field image file data $v_d$, and said stored binned file comprises R, G, and B file data, and further comprising the step of reproducing enhanced color images by executing:

$$y_{corrected\,image} = (v_{iR} - v_d)\,1/R\,g_1 + \\ (v_{iG} - v_d)\,1/G\,g_2 + (v_{iB} - v_d)\,1/B\,g_3$$

where $g_1$, $g_2$, and $g_3$ are gain or scaling factors for the individual colors to balance the image.

25. The method of claim 16 further comprising the step of separately binning said sensed n×n signals representative of said color image and correcting for image non-uniformities due to said sensing means to decouple said non-uniformities from non-uniformities due to said liquid crystal tuning filter.

26. The method of claim 16 further comprising the step of performing gamma correction on the image being produced.

27. The method of claim 16 wherein said correction executable algorithm comprises an n-point correction algorithm.

28. A system for storing color correction information for liquid crystal tuning filters when used with electronic imaging cameras to produce color images, comprising:

means, having a sensing matrix of n×n, for sensing a color image produced by an LCTF filter and producing real image file data $v_{iR}$, $v_{iG}$, $v_{iB}$, dark field image file data $v_d$, and R, G, B file data from the sensed n×n signals representative of said color image;

means for binning said n×n signals into an m×m file, where n>m;

means for compressing said m×m file and allocating more bits to low frequency changes than high frequency changes;

means for storing said compressed file with a correction executable algorithm; and means for invoking said stored compressed file and said correction executable algorithm to decompress said stored file and automatically take control of image enhancement when a color image is being reproduced to enhance the color image, said invoking means comprising means for executing:

$$y_{corrected\,image} = (v_{iR} - v_d)\,1/R\,g_1 + \\ (v_{iG} - v_d)\,1/G\,g_2 + (v_{iB} - v_d)\,1/B\,g_3$$

where $g_1$, $g_2$, and $g_3$ are gain or scaling factors for the individual colors to balance the image.

29. A system as in claim 28 further comprising means for separately binning said sensed n×n signals representative of said color image and correcting for image non-uniformities due to said sensing means to decouple said non-uniformities from non-uniformities due to said LCTG filter.

30. A system as in claim 28 wherein said sensing means comprises means for performing gamma correction on the color image being sensed and stored.

31. A system as in claim 28 wherein said means for storing said binned file with a correction executable algorithm comprises means for storing a color correction white flat file composed of raw histograms for flat field RGB files used in correction, and further comprising:

means, operable before said means for compressing, for subtracting and storing the offset for use during image enhancement when a color image is being reproduced.

32. A system as in claim 28 wherein said sensing means comprises a coded sensor and further comprising means for executing said executable correction algorithm to produce coded image enhancement with 2×2 resolution.

33. A system as in claim 28 further comprising means for storing several flat fields at different intensities.

* * * * *

UNITED STATES PATENT AND TRADEMARK OFFICE
CERTIFICATE OF CORRECTION

PATENT NO. : 5,818,525
DATED : Oct. 6, 1998
INVENTOR(S) : Elabd

It is certified that error appears in the above-identified patent and that said Letters Patent is hereby corrected as shown below:

Column 8, lines 10 and 11, Replace "$\Gamma_{iR'}$" with --$v_{iR'}$--
Replace "$\Gamma_{iG'}$" with --$v_{iG'}$--
Replace "$\Gamma_{iB'}$" with --$v_{iB'}$--
Replace "$\Gamma_{d'}$" with --$v_{d'}$--

Column 10, line 21, "LCTG" should be replaced with --LCTF--

Signed and Sealed this

Twenty-third Day of March, 1999

Attest:

Q. TODD DICKINSON

Attesting Officer

Acting Commissioner of Patents and Trademarks